Patented Oct. 19, 1937

2,096,678

UNITED STATES PATENT OFFICE 2,096,678

PROCESS OF PRODUCING ROTENONE AND ASSOCIATED SUBSTANCES FROM NATURAL SOURCES CONTAINING THE SAME

Eric William Fawcett, Winnington, Northwich, England, assignor to Imperial Chemical Industries Limited, a corporation of Great Britain No Drawing. Application October 25, 1935, Serial No. 46,824. In Great Britain October 29, 1934

11 Claims. (Cl. 167—24)

The invention relates to the production of rotenone and associated substances of insecticidal value from natural sources containing them, the more important of which are the roots derris root and cubé root.

The customary method of obtaining the active materials from such roots comprises the extraction of the root with a volatile solvent, followed by the evaporation of the solvent.

I have now found that rotenone and associated insecticidal-active materials can be obtained from natural substances containing them by subjecting the said substances to distillation in a high vacuum, preferably a short-path high-vacuum evaporative distillation, which may be defined as distillation without ebullition under an extremely high vacuum of between $10^{-2}$ and $10^{-6}$ mms. of mercury, with the evaporating and condensing surfaces substantially co-extensive and in close proximity, namely at a distance of from a fraction of an inch to a few inches apart.

The natural source itself may be directly subjected to distillation, in fine-ground solid state, to evaporate off the active constituents and recover them in solid form; for example by employing an apparatus of the type in which the evaporating and condensing surfaces have the form of moving bands so that the finely ground distilland can be evenly spread over the evaporating surface. In practice, however, it is convenient to introduce the initial material into the distillation apparatus as a mixture with a liquid substance (i. e. a substance which is liquid at the operating temperature). This is convenient because liquid, or at least fluent, mixtures are more easily handled than solids; they can be readily piped, pumped, drained, etc. and when put on a horizontal surface they tend to level out and form a uniform distilling surface. Moreover, liquids have much better heat transfer qualities than finely divided solids, which is an especially important consideration in evaporative distillation.

In using liquids there are several optional modes of procedure. It is sometimes convenient to employ a liquid which is a solvent for the active substances, in which case prior to distillation the solution is separated from insoluble matter by filtration or other suitable means. The liquid used is generally one which is non-volatile at the operating temperature, for example a linseed oil stand oil or a mineral oil fraction which has previously been treated in a high vacuum to remove volatile constituents at a temperature somewhat higher than that required in the present process. The condensate from the distillation may suitably be removed from the condensing surface by melting down, by scraping, or by rinsing with a solvent. In some cases, however, a volatile or partially volatile carrier liquid may be employed, notably with the object of furnishing a solution or mixture applicable directly as an insecticide (if desired with further dilution) as condensate. In this case the condensate is liquid and can be readily removed by draining, pumping etc. Mineral oils or fractions thereof are useful in such modification.

The product is a condensate containing substantially all the rotenone and associated substances of insecticidal activity of the raw material. By re-distillation, or by collecting appropriate fractions, it is possible to obtain practically pure rotenone; when the product is to be employed as an insecticide, this is not, however, in general necessary or desirable, because the associated substances themselves appear to make a definite contribution to the insecticidal properties of the product.

The invention is illustrated but not limited by the following examples, in which the parts are by weight.

Example 1

50 parts of dry ground derris root are mixed with 100 parts of a linseed oil stand oil which has previously been treated in a high vacuum at 220° C. to remove volatile constituents. The mixture of derris root and oil is fed on to a heated surface or surfaces maintained at about 120° C. and in close proximity to a cold condening surface, the whole apparatus being evacuated to about $10^{-4}$ mms. of mercury. A pale yellow condensate is obtained, giving the reactions of rotenone and containing substantially all the active material present in the original root.

A useful apparatus for carrying out this process is disclosed and claimed in a copending application of Eric W. Fawcett et al., Serial No. 46,824, filed March 7, 1935; the apparatus comprising an evacuated chamber, a hot surface therein and a cold surface spaced a small distance therefrom, and a scraper for removing condensate continuously or from time to time. Optionally, the process can be carried out in high vacuum evaporative stills such as shown in U. S. Patent 1,925,559 to Hickman; though such apparatus, which has no scrapers, is better adapted for use in embodiments of the invention wherein it is provided that both residue and condensate are fluent.

Example 2

The short-path high-vacuum still employed is of the type in which the evaporating and condensing surfaces comprise thin flexible continuous metal bands, the effective portions lying in horizontal planes and the evaporating surface situated below the condensing surface, adapted to move in close proximity to heating and cooling bodies respectively. Finely ground and dried derris root is fed to the evaporating surface, which is heated to a temperature of 150–160° C., the pressure in the still being not above $10^{-3}$ mms. of mercury. The condensate product is a bright yellow waxy solid which may be removed by a knife-edge from the moving condensing surface and allowed to fall into a suitable receptacle.

Example 3

1 part by weight of dried powdered derris root is mixed with 2 parts of a mineral oil which has been subjected to high vacuum distillation under such conditions that it has but a negligible vapor pressure at a temperature of 200° C. or less and a pressure of $10^{-5}$ mm. of mercury (which is to say, it is free of matter volatile at such temperature or less); one such oil being known to the trade as "Apiezon K". The mixture is maintained at 80° C. for 30 minutes, then filtered hot. The filtrate is fed to the evaporating surface of a short-path high-vacuum still, the temperature of the evaporating surface being 165° C. and the pressure within the apparatus about $10^{-4}$ mms. of mercury. Rotenone and the associated substances are condensed on the condensing surface as a yellow solid which may be removed by scraping or by melting. The residual liquor from the evaporating surface may be used for treating further quantities of derris root.

In each of the foregoing examples dry powdered cubé root may be substituted for the derris root with precisely similar results.

I have mentioned as suitable carrier liquids linseed oil stand oil and certain mineral oils treated by vacuum distillation. Other carrier liquids may also be used, such for example as heavy mineral oil fractions, or unbodied triglyceride oils (previously freed from free fatty acids), e. g. cotton-seed oil and olive oil. Both cotton-seed oil and olive oil are solvents for rotenone and the other active ingredients of derris and cubé roots, and are suitable for use in place of the non-volatile mineral oil in Example 3 above.

When it is desired to obtain a solution of the active ingredients as distillate, the dry powdered derris or cubé root may be mixed with a carrier liquid which is either wholly distillable at the temperatures and pressures employed, or comprises a portion so distillable. Thus there may be employed a mixture of the non-volatile mineral oil mentioned in Example 3 and a mineral oil of such character as to be completely volatile at 140° C; one such oil being known as "Apiezon A." The active ingredients distill over together with the lighter oil, leaving behind a suspension or solution of the residue in the non-volatile oil. The distillate, which is a more or less concentrated solution of the rotenone etc. in oil (the concentration can be varied by varying the proportion of lighter oil taken), is suitable for dilution with kerosene or other volatile mineral oil for use as insecticidal spray. If the carrier liquid is a solvent of the wholly distillable type, a similar solution of the rotenone etc. is obtained as distillate, and a solid residue remains on the distilling surface.

As many apparently widely different embodiments of this invention may be made without departing from the spirit and scope thereof, it is to be understood that I do not limit myself to the specific embodiments thereof except as defined in the appended claims.

I claim:—

1. Process for the production of rotenone preparations which comprises subjecting a natural rotenone-containing substance to distillation in a very high vacuum and collecting the distillate.

2. Process for the production of rotenone preparations which comprises subjecting a natural rotenone-containing substance to distillation without ebullition at a pressure of $10^{-2}$ to $10^{-6}$ mms. of mercury under such conditions that the evaporating and condensing surfaces are substantially co-extensive and are in close proximity to one another, and collecting the distillate.

3. Process as claimed in claim 2 in which the natural rotenone-containing substance is dried and ground and mixed before distillation with a carrier liquid.

4. A process for the production of rotenone preparations which comprises admixing a finely divided, dried rotenone-containing substance with a carrier liquid which is substantially non-volatile under short path distillation conditions, subjecting the mixture to short path distillation under vacua of the order of $10^{-2}$ to $10^{-6}$ mm. of mercury from a hot surface to a condensing surface closely spaced from the hot surface, collecting the distillate as a dry preparation, and collecting the residue in fluent admixture with the carrier liquid.

5. A process for the production of rotenone preparations which comprises admixing a finely divided, dried rotenone-containing substance with a carrier liquid which is substantially completely volatile under short path distillation conditions, subjecting the mixture to short path distillation under vacua of the order of $10^{-2}$ to $10^{-6}$ mm. of mercury from a hot surface to a cold condensing surface closely spaced from the hot surface, collecting the distillate in fluent admixture with the carrier liquid and collecting the residue dry.

6. A process for the production of rotenone solutions which comprises admixing a finely divided, dried rotenone-containing substance with a carrier liquid which is substantially completely volatile under short path distillation conditions and which is a solvent for rotenone, subjecting the mixture to short path distillation under vacua of the order of $10^{-2}$ to $10^{-6}$ mm. of mercury from a hot surface to a cold condensing surface closely spaced from the hot surface, collecting the residue dry and collecting as distillate purified rotenone in solution in the evaporated solvent.

7. A process for the production of rotenone preparations which comprises admixing a natural rotenone-containing substance in dry, finely divided state with a carrier liquid which has a component which is volatile under the conditions of short path distillation under very high vacua and another component which is non-volatile under such conditions, subjecting the mixture to short path distillation and collecting as a fluent mixture distilled rotenone and the volatile component of the carrier liquid, and collecting as a fluent mixture the residue of the rotenone-containing substance and the non-volatile component of the carrier liquid.

8. Process for the production of rotenone preparations which comprises mixing dry, ground derris root with a stand oil which has been freed from constituents volatile up to about 200° C. at $10^{-4}$ mm. of mercury, feeding the mixture to a heated surface maintained at about 120° C. in close proximity to a condensing surface maintained at a suitably lower temperature, the space between the surfaces being maintained at a pressure of $10^{-2}$ to $10^{-4}$ mm. of mercury, and collecting the condensate.

9. Process for the production of rotenone preparations which comprises mixing dry, ground derris root with a heavy mineral oil containing a fraction volatile at 120–170° C. at $10^{-4}$ mm. of mercury, feeding the mixture to a heated surface maintained at 120–170° C. in close proximity to a condensing surface maintained at a suitably lower temperature, the space between the surfaces being maintained at a pressure of $10^{-2}$ to $10^{-4}$ mm. of mercury, and collecting the condensate.

10. An insecticidal preparation comprising distilled rotenone and distilled insecticidal substances naturally associated with rotenone, in a heavy mineral oil volatile at 120° to 170° C. at $10^{-4}$ mms. of mercury, the rotenone and allied substances being characterized by being free of matter non-volatile at a pressure of about $10^{-2}$ to $10^{-6}$ mm. of mercury and a temperature of about 120°–165° C. and by being a pale yellow waxy solid when isolated from the oil.

11. As a new composition of matter, distilled rotenone with distilled insecticidal substances naturally associated therewith, free of matter non-volatile at a pressure of $10^{-2}$ to $10^{-6}$ mms. of mercury at an elevated temperature, about 120°–165° C., and being a pale yellow waxy solid.

ERIC WILLIAM FAWCETT.